US008419114B2

(12) United States Patent
Fannon et al.

(10) Patent No.: US 8,419,114 B2
(45) Date of Patent: Apr. 16, 2013

(54) DUAL ACTION HOOD LATCH ASSEMBLY FOR A VEHICLE

(75) Inventors: Joseph P. Fannon, Washington, MI (US); Edward J. Zentera, Jr., Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 48 days.

(21) Appl. No.: 13/221,454

(22) Filed: Aug. 30, 2011

(65) Prior Publication Data

US 2013/0049403 A1 Feb. 28, 2013

(51) Int. Cl.
*B60N 99/00* (2006.01)

(52) U.S. Cl.
USPC ............... 296/193.11; 292/DIG. 14; 180/69.2

(58) Field of Classification Search ............. 296/193.11; 292/DIG. 14; 180/69.2, 69.21
See application file for complete search history.

(56) References Cited

U.S. PATENT DOCUMENTS

| | | | | |
|---|---|---|---|---|
| 4,382,482 | A | 5/1983 | Brandl et al. | |
| 4,478,441 | A | 10/1984 | Fiordellisi et al. | |
| 4,589,514 | A | 5/1986 | Wilson et al. | |
| 4,756,562 | A * | 7/1988 | Foster et al. | 292/28 |
| 4,801,165 | A | 1/1989 | Pyle | |
| 4,872,366 | A | 10/1989 | Appleby et al. | |
| 4,917,417 | A | 4/1990 | Aubry | |
| 5,048,877 | A | 9/1991 | Rogers, Jr. et al. | |
| 5,150,933 | A | 9/1992 | Myslicki et al. | |
| 5,347,799 | A | 9/1994 | Hosaka et al. | |
| 5,445,421 | A | 8/1995 | Ferrara | |
| 5,535,608 | A | 7/1996 | Brin | |
| 5,618,069 | A | 4/1997 | Konchan et al. | |
| 5,803,198 | A * | 9/1998 | Baxter et al. | 180/69.21 |
| 5,853,060 | A | 12/1998 | Chao et al. | |
| 6,394,211 | B1 * | 5/2002 | Palenchar et al. | 180/69.21 |
| 6,991,055 | B2 * | 1/2006 | White et al. | 180/69.2 |
| 7,195,090 | B2 * | 3/2007 | Parks et al. | 180/271 |
| 2005/0000744 | A1 * | 1/2005 | White et al. | 180/69.2 |

* cited by examiner

*Primary Examiner* — Lori Lyjak
(74) *Attorney, Agent, or Firm* — Ingrassia Fisher & Lorenz, P.C.

(57) ABSTRACT

In accordance with exemplary embodiments, a hood latch assembly is provided for a vehicle. The hood latch assembly is configured to be positioned within a forward compartment of a vehicle and to releasably retain a hood of the vehicle in a closed position with a first hood latch and in a partly open position with a second hood latch. A hood latch release mechanism is configured to be positioned within a passenger compartment of the vehicle and be coupled to the hood latch assembly for releasing the first hood latch upon a first operation of the hood latch release mechanism and releasing the second hood latch upon a second operation of the hood latch release mechanism. This provides a dual-action release mechanism that can be operated entirely from within the vehicle.

20 Claims, 6 Drawing Sheets

DUAL ACTION HOOD LATCH ASSEMBLY FOR A VEHICLE

TECHNICAL FIELD

The technical field generally relates to hood latch assemblies for vehicles, and more particularly to a dual action hood latch assembly for a vehicle.

BACKGROUND

Contemporary vehicles typically include a hood providing closure to an engine compartment. The hood can be moved between an open position to permit access to the engine compartment and a closed position against the vehicle body to close off access to the engine compartment. Generally, a hood latch retains the hood in the closed position, but can be unlatched to permit the hood to be moved to its open position.

One common type of hood latch assembly includes a primary latch for latching the hood in its closed position, a cable release operable from inside the vehicle to move the primary latch to an unlatched position, and a pop-up spring to move the hood to a partly open position where the hood is held by a secondary latch. The secondary latch is provided as a safety feature should the primary latch release unexpectedly so that the hood cannot fly open while the vehicle is being operated. The secondary latch is typically manually operated through access at the front of the vehicle to allow the hood to be unlatched from its partly open position and moved towards its open position.

However, some users object to having to feel around under a partly open hood for the secondary hood release since the area around the vehicle grill or under the hood is often a dirty and hot environment. Also, getting out of the passenger compartment to move to the front of the vehicle may be inconvenient or undesirable due to inclement weather.

Accordingly, it is desirable to provide an improved hood latch assembly for a vehicle. Also, it is desirable to provide an improved hood latch assembly for a vehicle that overcomes the determents of conventional hood latch assemblies. Additionally, other desirable features and characteristics of the present invention will become apparent from the subsequent description taken in conjunction with the accompanying drawings and the foregoing technical field and background.

BRIEF SUMMARY

In accordance with exemplary embodiments, a hood latch and release mechanism is provided for a vehicle. The system comprises a hood latch assembly configured to be positioned within a forward compartment of a vehicle and to releasably retain a hood of a vehicle in a closed position with a first hood latch and in a partly open position with a second hood latch. A hood latch release mechanism configured to be positioned within a passenger compartment of the vehicle and be coupled to the hood latch assembly for releasing the first hood latch upon a first operation of the hood latch release mechanism. The second hood latch is released upon a second operation of the hood latch release mechanism. In one embodiment, this provides a dual-action release mechanism that can be operated entirely from within the vehicle. In other embodiments, the release mechanism could be located elsewhere on the vehicle.

In accordance with exemplary embodiments, a hood latch release method is provided for a vehicle. The method comprises releasing a first hood latch retaining a hood providing closure for a forward compartment of a vehicle upon a first operation of a hood latch release mechanism positioned within a passenger compartment of the vehicle. The second hood latch retains the hood in a partly open position and is released upon a second operation of the hood latch release mechanism positioned within the passenger compartment of the vehicle. In this way, both the first and second hood latches are released from within the passenger compartment of the vehicle allowing the hood to move to an open position.

DESCRIPTION OF THE DRAWINGS

The subject matter will hereinafter be described in conjunction with the following drawing figures, wherein like numerals denote like elements, and.

DETAILED DESCRIPTION

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Finally, for the sake of brevity, conventional techniques and components related to vehicle mechanical or electrical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention. It should also be understood that FIGS. 1-4 are merely illustrative and may not be drawn to scale.

Figure 1:
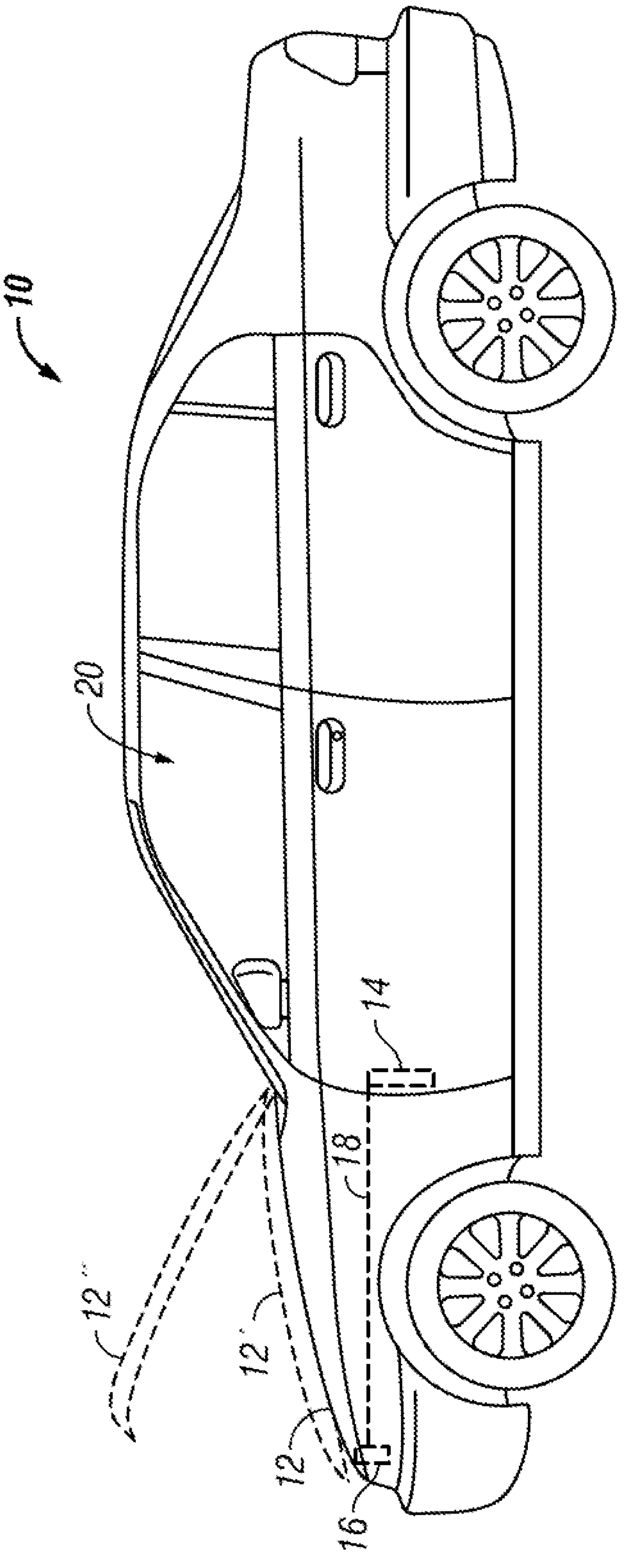
FIG. 1 is an illustration of a vehicle suitable for using exemplary mechanical embodiments of the present disclosure.

Referring to the drawings, wherein like reference numbers refer to like components, FIG. 1 shows a vehicle 10 suitable for use with the exemplary mechanical embodiments of the present disclosure. The vehicle 10 may be any one of a number of different types of vehicles, such as, for example, a sedan, a wagon, a truck, or a sport utility vehicle (SUV), and may be two-wheel drive (2WD), four-wheel drive (4WD), or all-wheel drive (AWD). The vehicle 10 may also incorporate any one of, or combination of, a number of different types of engines, such as, for example, a gasoline or diesel fueled combustion engine, a flex fuel vehicle (FFV) engine (i.e., using a mixture of gasoline and alcohol), a gaseous compound (e.g., hydrogen and/or natural gas) fueled engine, a combustion/electric motor hybrid engine, and an electric motor.

The vehicle 10 includes a hood 12 that provides closure to a forward compartment, which in some embodiments may be an engine compartment. The hood 12 is shown in solid lines in its closed position and in dashed lines in a partly open position 12' and a fully open position 12". The hood 12 may be released by operation of a hood release handle 14 that causes a hood latch assembly 16 to release the hood via a hood release cable 18. Together the hood release handle 14 and the hood release cable 18 form a hood release mechanism for the exemplary mechanical embodiments of the present disclosure. A first operation of the hood release mechanism causes a first (or primary) hood latch to release the hood to a partly open position 12' where it is retained by a second (or secondary) hood latch as will be discussed in more detail below in conjunction with FIG. 4. However, unlike conventional secondary hood latches that require manual operation by a user through access at the front of the vehicle, exemplary embodiments of the present disclosure contemplate that the hood may be unlatched from its partly open position and fully released to move towards its open position from inside a passenger compartment 20 of the vehicle 10 via a second operation of the hood release mechanism. That is, a user may completely unlatch the hood (both the primary and secondary hood latches) so that it may be moved to an open position 12" while remaining comfortably within the vehicle 10.

Figure 2:
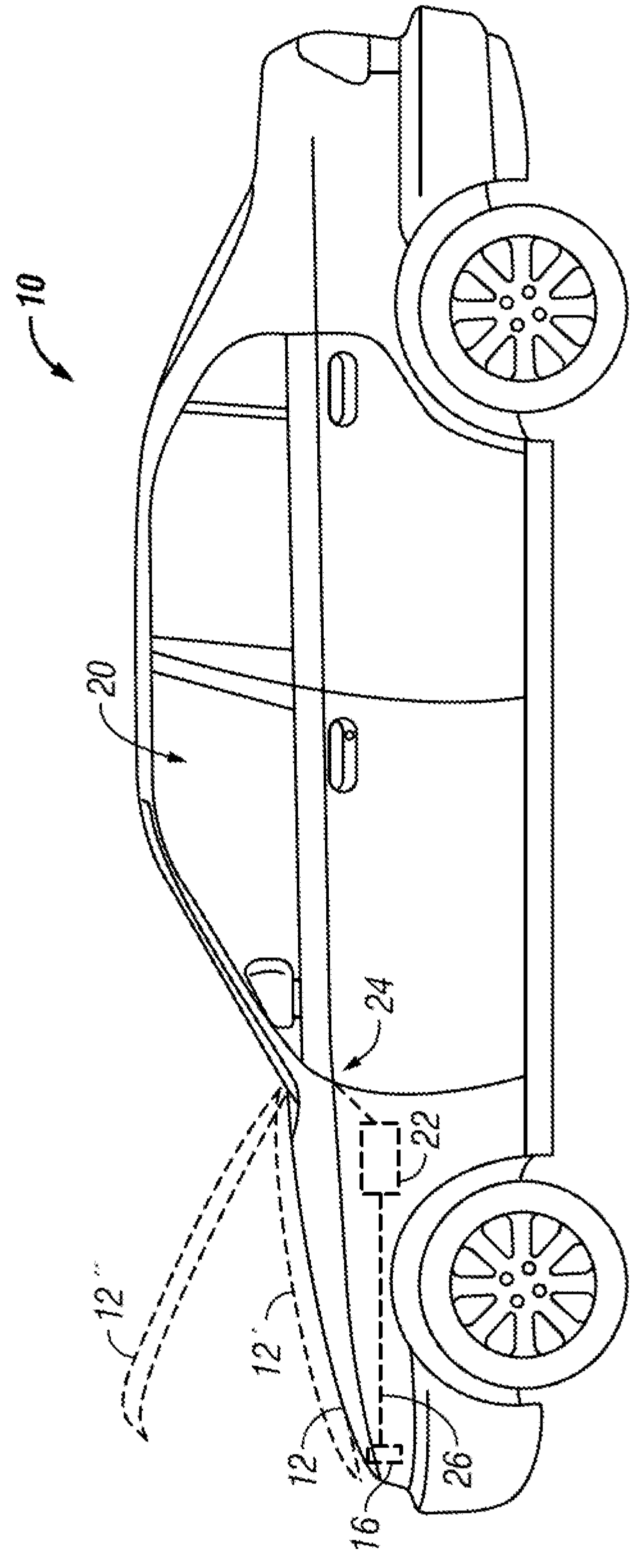
FIG. 2 is an illustration of a vehicle suitable for using exemplary electrical embodiments of the present disclosure.

Referring now to FIG. 2, wherein like reference numbers refer to like components, exemplary electrical embodiments of the present disclosure include a hood latch assembly 16 that is electrically operated by a vehicle controller 22 (or other electronic control system) upon a user activating a hood release switch or button 24. Together, the vehicle controller 22, the hood release switch 24, and wires 26 comprise a hood release mechanism for the exemplary electrical embodiments of the present disclosure. The vehicle controller 22 communicates via one or more wires 26 that carry a signal or power to an electrical release device that operates the hood latch assembly 16 to release the hood 12 from its closed position upon a first operation of the hood release switch to its partly open position 12'. A second operation of the hood release switch 24 unlatches the secondary hood latch allowing the hood 12" to move to its open position.

Figure 3:
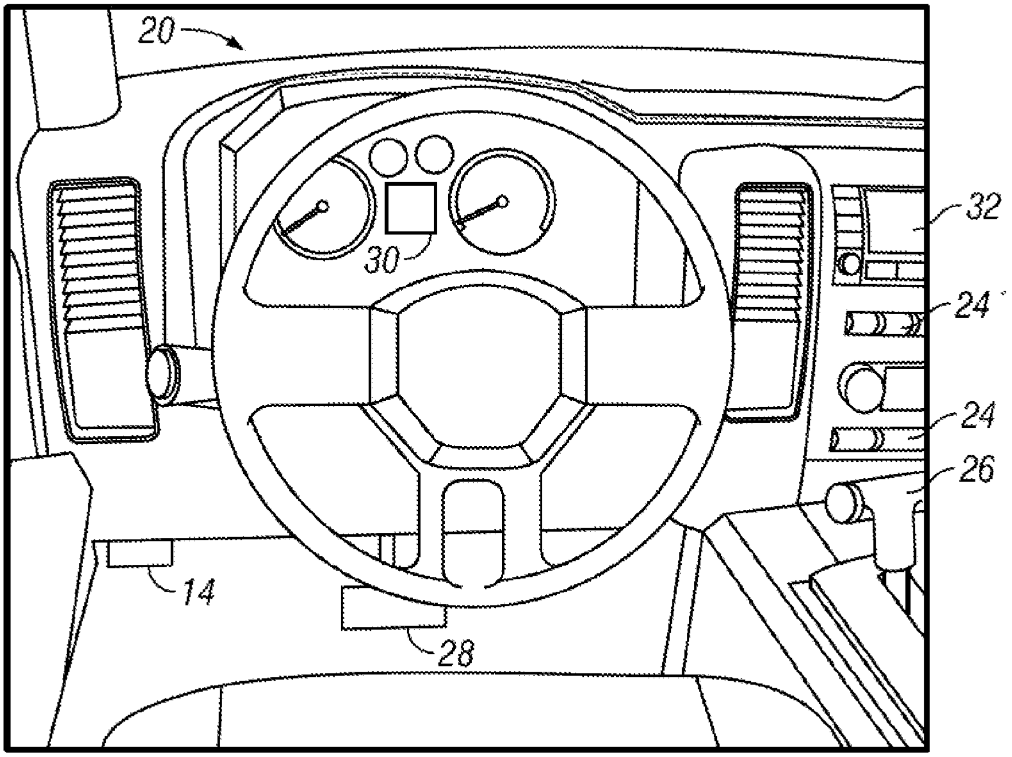
FIG. 3 is an illustration of a portion of a passenger compartment of the vehicle of FIG. 1 or FIG. 2.

FIG. 3 is an illustration of a portion of the passenger compartment 20 of the vehicle 10 of FIG. 1 or 2. In the mechanical embodiments (FIG. 1) of the hood release mechanism, a hood release handle 14 is positioned for operation by a user. For the electrical embodiments (FIG. 2) of the hood release mechanism, a hood release switch (e.g., button) 24 is shown positioned on the dashboard of the passenger compartment 20. It will be appreciated, however, that the hood release handle 14 and the hood release switch 24 may be positioned in other areas of the passenger compartment 20 as determined by the vehicle manufacturer for the convenience of the user.

Since the hood 12 may be completely unlatched from within the vehicle (see FIG. 1 or 2), the present disclosure contemplates a number of safety lockout systems for the assurance and protection of the vehicle occupants. First, in accordance with conventional mechanical vehicle lockout systems, the hood release handle 14 may be prevented from operating unless a shift lever 26 is in the "park" position. Also, the hood release handle 14 may be prevented from operating unless a brake pedal 28 is depressed toward the floor board. Additionally, the hood release handle 14 may be prevented from operating unless the engine (not shown) is off.

It is also common for contemporary vehicles to have a hood ajar warning indicator that would be activated upon the first operation of the hood release handle 14 as a cautionary measure before the second operation of the hood release handle 14 was permitted. In various embodiments, the hood ajar warning indicator could be an illuminated phrase or icon 30 in the dashboard or a message that is presented on a display 32 of a driver information center of the vehicle. Either of these visual warning indicators could be accompanied by an audible tone or recorded (stored) voice message to warn the user that the hood 12' (see FIG. 1 or 2) is ajar. Finally, in the abundance of caution, the engine (not shown) of the vehicle could be turned off (if running) if the shift lever 26 was taken out of the "park" position while the hood ajar warning indicator was active.

The electrical embodiments (see FIG. 2) also contemplate a number of safety lockout features. Generally, these embodiments make use of the vehicle controller (22 in FIG. 2) to monitor various systems within the vehicle. Generally, in the electrical embodiments, the hood release switch 24 will be operable (that is, the switch can be depressed), however, the vehicle controller will not send a signal or power to the solenoid operating the hood latch (16 in FIG. 2) if, for example, the shift lever 26 is not in the "park" position or the brake pedal 28 is not depressed toward the floor. Other safety lockout conditions include, but are not limited to, the vehicle controller (22 of FIG. 2) detecting that the vehicle is moving or the engine is running. In some embodiments, a pair of hood release switches (24 and 24') must be simultaneously activated (depressed) as a further precautionary measure against accidental hood opening. Also, the pair of hood release switches (24 and 24') may be positioned far enough apart to require the use of two hands.

Figure 4:
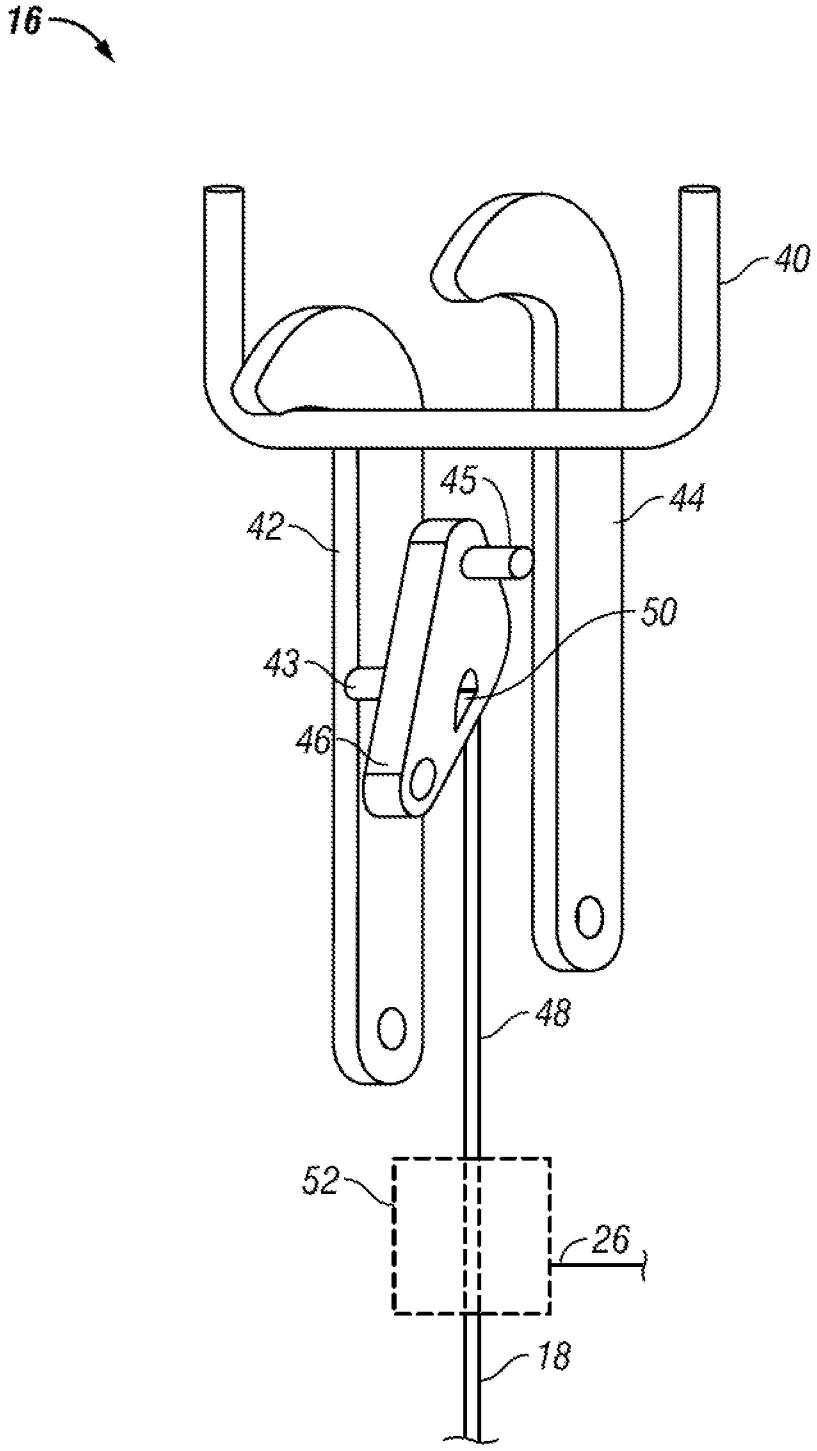
FIG. 4 is a perspective illustration of a dual-action hood latch according to mechanical or electrical embodiments of the present disclosure.

FIG. 4 is a perspective illustration of a dual-action hood latch 16 in accordance with either the mechanical (FIG. 1) or electrical (FIG. 2) exemplary embodiments of the present disclosure. The hood latch 16 engages a striker 40 that is coupled to the underside of the hood (not shown in FIG. 4). In the closed position, a first (primary) hood latch 42 engages the striker 40 as shown. A second (secondary) hood latch 44 is positioned above the striker 40 to engage it upon the release of the striker 40 from the first hood latch 42 so that the hood (12' of FIG. 1 or 2) rises (via conventional spring bias or equivalent) to the partly open position. The first and second hood latches (42 and 44) are operated by a cam 46 that has pins (43 and 45) that rotate the first and second hood latch (42 and 44 respectively) in a clockwise direction (in FIG. 4) to release the striker 40 upon a first operation and then a second operation of a hood latch release mechanism (not shown in FIG. 4). The cam 46 is coupled via a fastener 50 to a cable or rod 48, which in turn may be connected to a solenoid 52 in the electrical embodiments (see FIG. 2) or to the hood release cable (18 of FIG. 1) in the mechanical embodiments. The solenoid 52 receives operational signal or power (to energize the solenoid) via wires 26 that are coupled to the vehicle controller (22 of FIG. 2). In the various mechanical embodiments, it will be appreciated that the hood release cable 18 may be directly coupled to the cam 46 via the fastener 50 if desired in any particular embodiment.

Figure 5B:
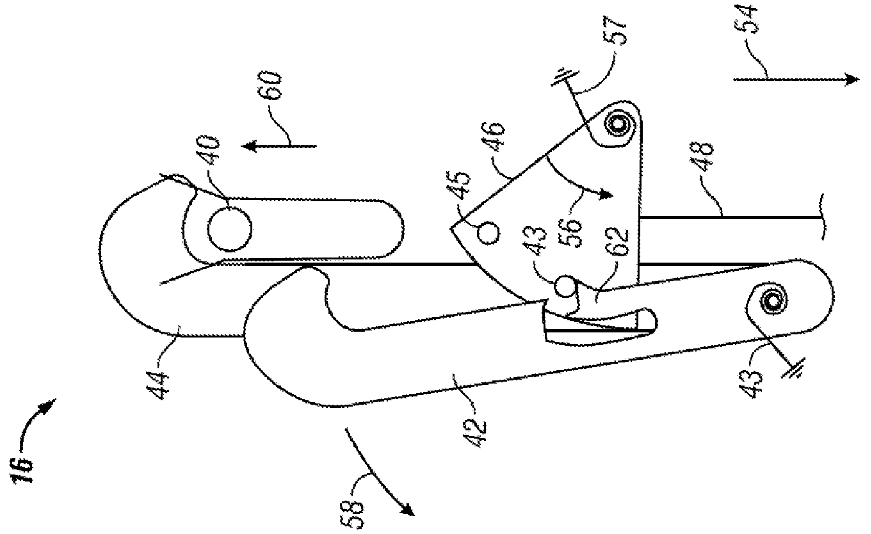
FIGS. 5A-5D are side-view illustrations of the hood latch of FIG. 4 that demonstrate the dual-action operation of the hood latch assembly according to mechanical or electrical embodiments of the present disclosure.
Figure 5A:
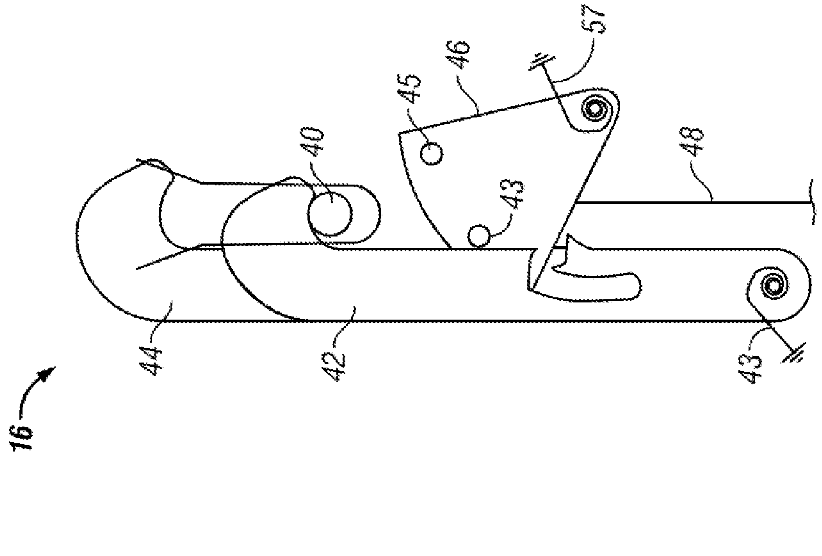
Figure 5D:
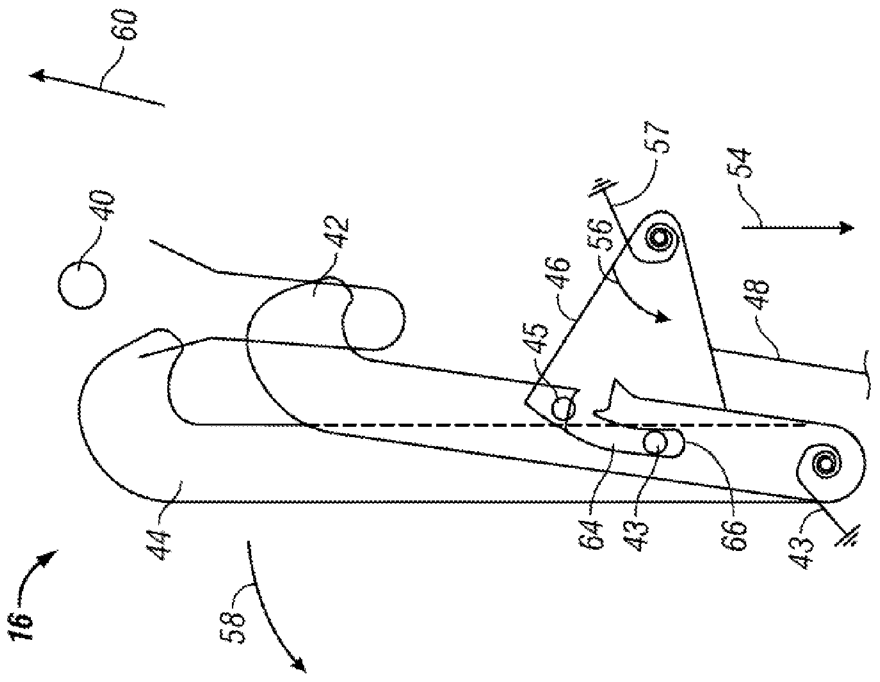
Figure 5C:
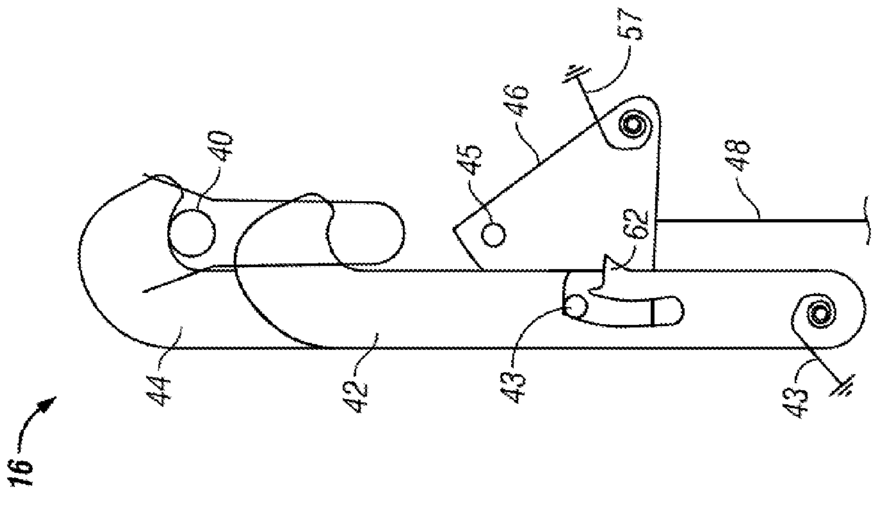

FIGS. 5A-5D are side-view illustrations of the hood latch 16 that demonstrate its dual-action operation. FIG. 5A shows the hood latch 16 in the hood (12 of FIG. 1 or 2) closed position with the striker 40 retained by the first hood latch 42. In FIG. 5B, the first operation of the hood release mechanism (not shown in FIGS. 5A-5B) begins by causing a downward force 54 on the cam 46 either via the solenoid or hood release cable (52 and 18 respectively of FIG. 4) that is coupled to the rod or cable 48. The downward force 54 causes the cam 46 to rotate in a counter-clockwise (in FIGS. 5A-5B) direction (as indicated by arrow 56) against the bias of spring 57. Pin 43, in turn, rotates the first hood latch 42 against the bias of spring 43 in a counter-clockwise direction (as indicated by arrow 58) releasing the striker 40, which begins to rise (via conventional spring bias or equivalent) as indicated by arrow 60. The cam 46 continues to rotate until pin 43 encounters a stop 62 in the first hood latch 42, which prevents further travel of the cable or rod 48. This completes the first operation of the hood release mechanism and the hood (12' of FIG. 1 or 2) is now positioned in the partly open position where the striker 40 is engaged by the second hood latch 44 as shown in FIG. 5C.

In FIG. 5D, the second operation of the hood release mechanism again begins by causing a downward force 54 on the cam 46 either via the solenoid or hood release cable (52 and 18 respectively of FIG. 4) that is coupled to the rod or cable 48. The downward force 54 causes the cam 46 to rotate further in a counter-clockwise (in FIGS. 5A-5B) direction (as indicated by arrow 56). Pin 45, in turn, rotates the second hood latch 44 in a counter-clockwise direction (as indicated by arrow 58) releasing the striker 40, which continues to rise (via conventional spring bias or equivalent) as indicated by arrow 60. The cam 46 continues to rotate until pin 43 travels down a channel 64 in the first hood latch 42 and encounters a stop 66 at the bottom of the channel 64 which prevents further travel of the cable or rod 48. This completes the second operation of the hood release mechanism and the hood (12" of FIG. 1 or 2) may now be moved to a fully open position since the striker 40 is now released from second hood latch 44. It will be appreciated that while the exemplary embodiment of FIGS. 5A-5D have been illustrated as pull-pull dual-action for the first and second operations of the hood release mechanism, that the various embodiments of the present disclosure are readily adaptable to a pull-push, push-pull or push-push dual-action operation.

Accordingly, a dual-action hood latch is provided for a vehicle facilitating release of both a first (primary) hood latch and a second (secondary) hood latch from within the passenger compartment of a vehicle. Numerous safety lockout systems are contemplated for the assurance and safety of the occupants of the vehicle.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing summary and detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle, comprising:

a hood providing closure for a forward compartment of the vehicle;

a hood latch assembly positioned within the forward compartment and configured to releasably retain the hood in a closed position with a first hood latch and in a partly open position with a second hood latch;

a hood latch release mechanism operable from within a passenger compartment of the vehicle and coupled to the hood latch assembly for releasing the first hood latch upon a first operation of the hood latch release mechanism and releasing the second hood latch upon a second operation of the hood latch release mechanism;

wherein, both the first and second hood latches are released from within the passenger compartment of the vehicle allowing the hood to move to an open position.

2. The vehicle of claim 1, wherein the hood latch release mechanism further comprises a release cable coupled to the hood latch assembly and to a release handle within the passenger compartment.

3. The vehicle of claim 2, further comprising a lockout system preventing the release handle from operation.

4. The vehicle of claim 3, wherein the lockout system prevents the release handle from operation unless a shift lever of the vehicle is in a park position.

5. The vehicle of claim 3, wherein the lockout system prevents the release handle from operation unless a brake pedal of the vehicle is depressed.

6. The vehicle of claim 3, wherein the lockout system prevents the release handle from operation unless an engine of the vehicle is off.

7. The vehicle of claim 4, further comprising a hood ajar warning indicator that becomes activated when the hood moves to the partly open position.

8. The vehicle of claim 7, wherein an engine of the vehicle is turned off if a shift lever of the vehicle is taken out of the park position when the hood ajar warning indicator is active.

9. The vehicle of claim 1, wherein the hood latch release mechanism further comprises an electrical release device coupled to the hood latch assembly, the electrical release device being activated by a vehicle controller responsive to receiving a first command to release the first hood latch from within the passenger compartment of the vehicle.

10. The vehicle of claim 9, wherein the electrical release device is activated by the vehicle controller responsive to receiving a second command to release the second hood latch.

11. The vehicle of claim 10, further comprising a lockout system preventing the vehicle controller from activating the electrical release device.

12. The vehicle of claim 11, wherein the lockout system prevents the vehicle controller from activating the electrical release device when the vehicle is moving.

13. The vehicle of claim 11, wherein the lockout system prevents the vehicle controller from activating the electrical release device unless a shift lever of the vehicle is in a park position.

14. The vehicle of claim 11, wherein the lockout system prevents the vehicle controller from activating the electrical release device unless a brake pedal of the vehicle is depressed.

15. The vehicle of claim 1, further comprising a bias element for raising the hood above the first hood latch upon the first operation of the hood latch release mechanism and raising the hood above the second hood latch upon the second operation of the hood latch release mechanism.

16. A system, comprising:

a hood latch assembly configured to be positioned within a forward compartment of a vehicle and to releasably retain a hood of a vehicle in a closed position with a first hood latch and in a partly open position with a second hood latch; and a hood latch release mechanism configured to be positioned within a passenger compartment of the vehicle and be coupled to the hood latch assembly for releasing the first hood latch upon a first operation of the hood latch release mechanism and releasing the second hood latch upon a second operation of the hood latch release mechanism.

17. The system of claim 16, wherein the hood latch release mechanism further comprises a release cable coupled to the hood latch assembly and to a release handle within the passenger compartment.

18. The system of claim 16, wherein the hood latch release mechanism further comprises an electrical release device coupled to the hood latch assembly, the electrical release device being configured to be activated by a vehicle controller of the vehicle.

19. The system of claim 16, further comprising a lockout system configured to prevent the hood latch release mechanism from operating.

20. A method, comprising:

releasing a first hood latch retaining a hood providing closure for a forward compartment of a vehicle upon a first operation of a hood latch release mechanism positioned within a passenger compartment of the vehicle; and releasing a second hood latch retaining the hood in a partly open position upon a second operation of the hood latch release mechanism positioned within the passenger compartment of the vehicle;

whereby, both the first and second hood latches are released from within the passenger compartment of the vehicle allowing the hood to move to an open position.

* * * * *